(12) United States Patent
Schevin

(10) Patent No.: US 9,990,071 B2
(45) Date of Patent: Jun. 5, 2018

(54) GESTURE EVENT DETERMINATION

(71) Applicant: Elo Touch Solutions, Inc., Milpitas, CA (US)

(72) Inventor: Olivier Schevin, La Plaine Saint Denis (FR)

(73) Assignee: Elo Touch Solutions, Inc., Milpitas, CA (US)

( * ) Notice: Subject to any disclaimer, the term of this patent is extended or adjusted under 35 U.S.C. 154(b) by 211 days.

(21) Appl. No.: 14/759,751

(22) PCT Filed: Jan. 8, 2014

(86) PCT No.: PCT/EP2014/000019
§ 371 (c)(1),
(2) Date: Jul. 8, 2015

(87) PCT Pub. No.: WO2014/108328
PCT Pub. Date: Jul. 17, 2014

(65) Prior Publication Data
US 2015/0346893 A1 Dec. 3, 2015

(30) Foreign Application Priority Data
Jan. 8, 2013 (EP) .................................... 13290004

(51) Int. Cl.
*G06F 3/045* (2006.01)
*G06F 3/041* (2006.01)
(Continued)

(52) U.S. Cl.
CPC ............ *G06F 3/0414* (2013.01); *G06F 3/043* (2013.01); *G06F 3/0488* (2013.01); *G06F 2203/04105* (2013.01)

(58) Field of Classification Search
None
See application file for complete search history.

(56) References Cited

U.S. PATENT DOCUMENTS 9,164,605 B1 * 10/2015 Pirogov .................. G06F 3/041
2003/0206162 A1 * 11/2003 Roberts ................ G06F 3/0414
345/173

(Continued)

FOREIGN PATENT DOCUMENTS

| EP | 1 762 926 A2 | 3/2007 |
| EP | 2 405 332 A1 | 1/2012 |
| KR | 2008 0050169 A | 6/2008 |

OTHER PUBLICATIONS

International Search Report and Written Opinion for Application No. PCT/EP2014/000019 dated Feb. 27, 2014.

(Continued)

*Primary Examiner* — Christopher R Lamb
(74) *Attorney, Agent, or Firm* — Alston & Bird LLP

(57) ABSTRACT

The present invention relates to a method for determining a gesture event in a touch sensitive device comprising at least one transducer, the method comprising the steps of: (a) sensing frames of a raw signal from the at least one transducer; (b) determining a value of a predetermined parameter for each frame of the raw signal; and (c) determining a rising edge and a falling edge in the raw signal based on the values of the predetermined parameter, thereby determining the gesture event.

16 Claims, 3 Drawing Sheets

(51) Int. Cl.
    *G06F 3/0488*    (2013.01)
    *G06F 3/043*    (2006.01)

(56) References Cited

U.S. PATENT DOCUMENTS

| | | | |
|---|---|---|---|
| 2007/0079206 A1* | 4/2007 | Arora | G06F 3/038 |
| | | | 714/745 |
| 2007/0229466 A1 | 10/2007 | Peng et al. | |
| 2009/0157206 A1 | 6/2009 | Weinberg et al. | |
| 2011/0199315 A1* | 8/2011 | Kent | G06F 3/0416 |
| | | | 345/173 |
| 2013/0057489 A1* | 3/2013 | Morton | G06F 1/169 |
| | | | 345/173 |
| 2014/0082545 A1* | 3/2014 | Zhai | G06F 3/04886 |
| | | | 715/773 |

OTHER PUBLICATIONS

European Search Report for Application No. EP 13 290 004 dated May 21, 2013.

\* cited by examiner

GESTURE EVENT DETERMINATION

The present invention relates to a method for determining a gesture event in a touch sensitive device and a device configured to determine the gesture event.

A touch-based-gesture detection by a touch sensitive device is based on the interpretation of a set of (X, Y) coordinates representing a sequence of touch locations on a touch sensitive interface of the device following a single- or multi-touch user interaction with the device. Well known touch based gestures are zoom-in, zoom-out, swipe, pinch, etc. For these gestures, the touch locations are determined in a precise way to be able to identify the corresponding touch-based-gesture. This analysis needs rather powerful signal processing which, in turn, is more cost extensive.

One such technology is the so called Acoustic Pulse Recognition (APR) technology, in which a touch location can be determined by comparing acoustic signals generated due to the user's touch interaction with predetermined touch locations stored in a lookup table. However, such a lookup table has to be generated first and, furthermore, additional algorithms must be used in order to account for the aging of the device, a change in the surrounding temperature and/or humidity variations and the like. In addition, care must be taken to acoustically decouple the touch sensitive areas of the devices using APR, in particular, in cases in which the touch sensitive areas are also used to hold or handle the device. In such cases, the sensed data may be influenced by unintentional touch events e.g. linked to holding or handling the device.

For some devices there is, however, no need for a precise analysis of the gesture as they work with a limited set of gestures not needing the precise determination of the touch locations during a gesture. Such devices are, for instance, eReaders or ebooks, which may only need to identify the presence of a swipe gesture to turn over pages. For such a device, it can be sufficient to just identify the type of gesture, eventually completed with a direction, e.g. left swipe, right swipe.

It is therefore the object of the present invention to provide a method for determining a gesture event in a touch sensitive device which simplifies the gesture detection process.

This object is achieved with a method for determining a gesture event in a touch sensitive device comprising at least one transducer, the method comprising the steps of: (a) sensing frames of a raw signal from the at least one transducer; (b) determining a value of a predetermined parameter for each frame of the raw signal; and (c) determining a rising edge and a falling edge in the raw signal based on the values of the predetermined parameter, thereby determining the gesture event.

In this context, the term "gesture event" relates to any form of touch-based-interaction between a user and a touch sensitive device. For example, such a gesture event could include a tap, a swipe of at least one finger, a relative movement between two or more fingers of the user etc. Further, in this context, the term "frame" of the raw signal relates to sensing the raw signal, either as analog or digitally by the at least one transducer, as a function of time, frequency, etc. The at least one transducer can be, for example, a piezoelectric transducer, an acoustic sensor, an accelerometer, an optical sensor or any device having the functionality of transforming an input signal into an electric raw signal.

With the afore-mentioned method for determining a gesture event according to the invention, the gesture event is determined based on, in particular, only the rising edge and falling edge of the raw signal. The rising edge and falling edge are the features of the raw signal and are specific to a given gesture. Thus, by using the rising edge and falling edge of the raw signal, powerful and expensive signal processing means for determining the (X, Y) coordinates of the gesture event and also storing the predetermined locations in a lookup table would not be necessary, thereby simplifying the process of detecting the gesture event. Thus, in a situation in which the exact determination of the location of the gesture is not necessary to carry out the functionalities of the touch sensitive device, the inventive method provides a reliable yet simplified way to identify an intended touch gesture event.

With the inventive method, the need for additional algorithms is avoided and the device therefore becomes less sensitive to surroundings such as, for example, temperature and humidity variations; and less sensitive to device handling events, mechanical design of the device and noisy environments and the lookup table is not used. In particular, by using the specific features of the raw signal, the real and unwanted touch events can be reliably discriminated.

Preferably, the rising edge is detected when a value of the predetermined parameter for one of the frames of the raw signal is greater than a minimum threshold and a value of the predetermined parameter for the previous frame of the raw signal is less than the minimum threshold; and/or the falling edge is detected when a value of the predetermined parameter for one of the frames of the raw signal is less than a minimum threshold and a value of the predetermined parameter for the previous frame of the raw signal is greater than the minimum threshold.

By setting a minimum threshold and using the values of the predetermined parameter of two different frames, the rising edge and/or falling edge can be reliably determined such that the real touch gesture event can be discriminated from the unwanted or unintentional touch events. Thus, the rising edge and the falling edge enable identification of a potential touch gesture event.

Advantageously, the method for determining a gesture event in a touch sensitive device can further comprise the steps of: (d) searching the beginning of the gesture event based on the values of the predetermined parameter in frames sensed before the rising edge; and/or (e) searching the end of the gesture event based on the values of the predetermined parameter in frames sensed after the falling edge.

Searching for the beginning and/or the end of the potential touch gesture event would improve the rejection of unwanted or unintentional touch gesture events.

According to a preferred embodiment, the method for determining a gesture event in a touch sensitive device can further comprise a step of: detecting a noise level of the predetermined parameter, wherein the beginning of the gesture event is found at a frame, before the rising edge, at which a value of the predetermined parameter reaches the noise level; and/or the end of the gesture event is found at a frame, after the falling edge, at which a value of the predetermined parameter reaches the noise level.

By detecting the noise level of the predetermined parameter, the unwanted or unintentional touch gesture events could be filtered efficiently. In particular, the beginning and/or the end of the potential event can be reliably found. By knowing the true duration of a touch gesture event, the discrimination between real intended touch gesture events and false events can be done reliably.

Preferably, the method for determining a gesture event in a touch sensitive device can further comprise a step (f) of classifying the gesture event as an expected gesture event based on one or more properties of the raw signal calculated using the values of the predetermined parameter between the beginning of the gesture and the end of the gesture.

Once the beginning and the end of the gesture are found, the potential gesture event could be classified as the real gesture event or rejected. The classification is based on one or more properties of the raw signal sensed within the gesture event signal segment, i.e. using the values of the predetermined parameter within the beginning and end of the gesture. This reduces the amount of data to be analysed and, thus, the gesture detection process can be simplified and only the real gesture event can be determined.

According to a preferred embodiment, one of the properties of the raw signal can be a ratio between the maximum and mean predetermined parameter values between the beginning of the gesture and the end of the gesture.

Thus, the classification of the gesture could be based on a parameter already known during the detection process, i.e. the predetermined parameter values of the raw signal, thereby reducing external input data.

According to a preferred embodiment, a spectral flux value is defined as a ratio of the predetermined parameter values of the current frame and previous frame and one of the properties of the raw signal used to classify the touch gesture event can be a ratio between the maximum and mean spectral flux values between the beginning of the gesture and the end of the gesture. These parameters allow for a reliable discrimination between true and false events.

Advantageously, step f) is only carried out if the duration between the rising edge and the falling edge or between the beginning and the end of the gesture event is within a predetermined range, in particular ranges from 20 ms to 120 ms, thereby enabling rejection of events that are shorter or longer than, for example, a swipe gesture.

Preferably, the predetermined parameter values for each frame of the raw signal can be determined in a predetermined frequency range, in particular in the frequency range of 20 kHz to 25 kHz.

By determining the values of the predetermined parameter in a predetermined frequency range, the reliability of the classification can be further improved. Using, for instance, the frequency range of 20 kHz to 25 kHz, it was found that unwanted impact-like events could be filtered out.

According to an advantageous embodiment, the falling edge detection can be aborted when a value of the predetermined parameter for one of the frames of the raw signal is greater than a maximum threshold, thus going back to the rising edge detection step.

Thus, by using a maximum threshold, unwanted or impact-like events can be rapidly rejected without further detailed analysis.

According to a preferred embodiment, the gesture event can be classified as a specific gesture if the one or more properties of the raw signal is/are less than a set threshold.

For example, swipe gestures are used in devices such as eReaders or ebooks. Here, the accuracy of the location is not necessary but the detection of the gesture is. Thus, the inventive method can be used to reliably detect a swipe gesture and, therefore, advantageously be used in those devices.

According to a preferred embodiment, the raw signal can be sensed from more than the one transducer, and the predetermined parameter used for step c is the average predetermined parameter arrived at by averaging over the number of transducers. By analyzing the sensed signals of the transducers independently, it furthermore becomes possible to identify the direction of a gesture based on the time delay between identified gesture events in the different transducer signals.

Increasing the number of transducers increases the precision with which the predetermined parameter is determined and, thus, also the reliability.

Preferably, the predetermined parameter can be a root-mean-square level of the raw signal, in particular of any one of the energy, power, and amplitude of the raw signal.

A root-mean square level of the raw signal could be easily determined when compared to (X, Y) coordinates of a touch event. Further, depending on the hardware/software of the device, root-mean square values of any one of the energy, power and amplitude of the raw signal can be chosen for the gesture determination. By determining the root-mean square levels in a predetermined frequency range, using, for instance, the frequency range of 20 kHz to 25 kHz, it was found that unwanted impact-like events could be filtered out.

The object of the invention is also achieved with a device comprising a touch sensitive interface and a touch sensing means, wherein a front side and/or a back side and/or any one of the sides of the device act as a touch sensitive interface and the touch sensing means is configured to carry out the method according to one of the preceding claims.

In the inventive device, using the inventive method, the touch sensitive interface could be any one of a front side, a back side or any one of the sides of the device and the gesture determination would be robust against the device handling, noisy environments, mechanical design and could reject unwanted gestures.

Advantageous embodiments of the inventive method will be described in the following by referring to the Figures.

In the following, the best mode of carrying out the method and the device according to the invention will be described in detail.

Figure 1:
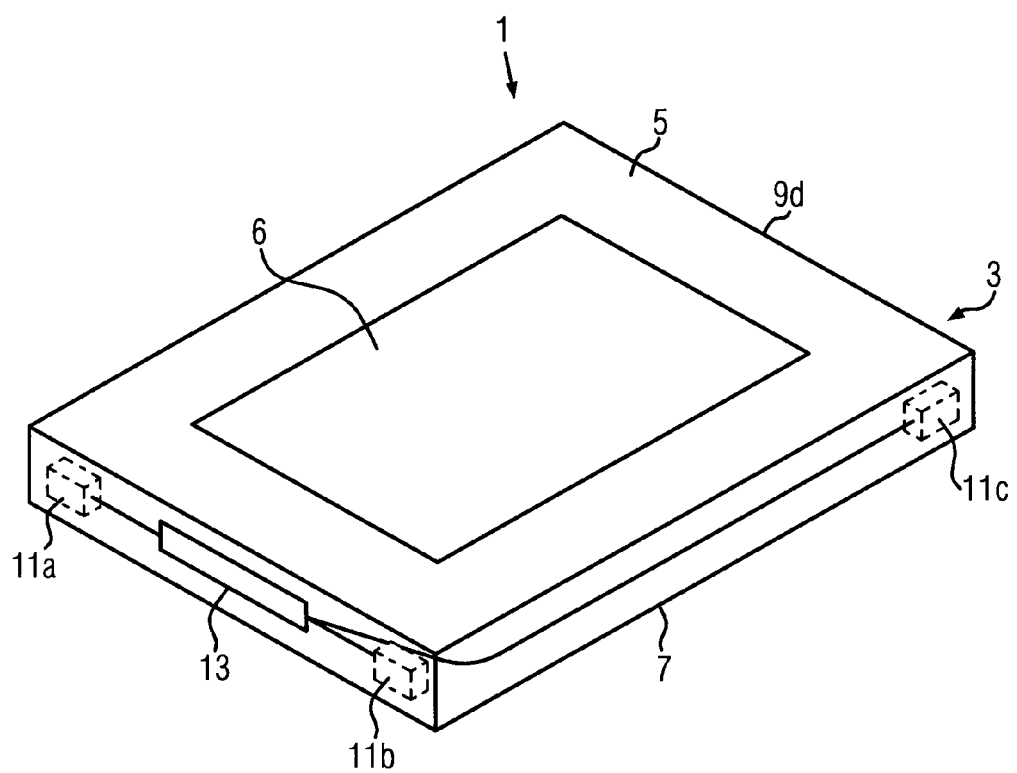
FIG. 1 illustrates a touch sensitive device comprising a touch sensing means according to the present invention.

In FIG. 1, a schematic view of a touch sensitive device 1 according to a first embodiment of the invention is illustrated. The device 1 can be any device with a man-machine interface. For instance the device could be a hand-held device, like a mobile telephone, a smart phone, an audio/video player, an ebook or a portable device, such as a laptop, a gaming console, a navigation system etc.

The touch sensitive device 1 comprises a casing 3 with a front side 5, a back side 7 and sides 9a-9d. The casing 3, depending on the device's use, can take any shape such as, for example, a rectangular or square cuboid. In the embodiment shown in FIG. 1, the front side 5 is opposite to the back side 7 of the casing 3, wherein the front side 5 is the side of the device 1 facing the user of the device 1. In this embodiment, a display 6 is integrated in the front side 5. The front side 5 may also comprise one or more additional keys as further interaction means. Additional displays or keys may be present on one or more other sides of the casing 3.

In the touch sensitive device 1 shown in FIG. 1, at least one of the front side 5, the back side 7 and the sides 9a-9d or parts of these surfaces can be configured as a touch-sensitive interface, allowing a user to provide inputs to the touch sensitive device 1. Alternatively, the front side 5, the back side 7 and the sides 9a-9d could all form a touch-sensitive interface. The touch-sensitive interface is configured to sense and identify one or more different touch-based gesture events during which one or more fingers of a user slide over the touch-sensitive interface.

The touch based gesture could be any one of a tap, a swipe of at least one finger, a relative movement between two or more fingers of the user etc, on the one or more touch interaction surfaces.

The touch sensitive device 1 further comprises at least one transducer 11. In this embodiment, the touch sensitive device comprises three transducers 11a, 11b, 11c positioned inside the casing 3. According to alternatives, the touch sensitive device 1 may only comprise one or two transducers or more than three transducers. The at least one transducer 11 can be, for example, a piezoelectric transducer, an acoustic sensor, an accelerometer, an optical sensor or any device having the functionality of transforming an input signal into an electric raw signal.

In this embodiment, the sensed signal is an acoustic signal that is generated by the touch of the user with the one or more surfaces of the casing 3. To be able to sense the acoustic signal, the transducers 11a to 11c are attached to the touch sensitive interface or are at least in acoustic contact. The coupling can be achieved by gluing, e.g. using Cyanocrylate glue, epoxy glue or the like.

The signals sensed by the transducers 11a to 11c are transmitted to a gesture determination means 13 where they are analyzed to identify touch gesture events. In the gesture determination means 13, the analog signals received from the transducers 11a to 11c are digitized to obtain frames of the raw signal for further processing. Each signal can be used to add directional information to an identified gesture, e.g. by using the time delay between the signals coming from the different transducers.

The gesture determination means 13 is further configured to process the raw signal frames in order to determine a predetermined parameter, here the root-mean-square of the signals amplitude for each frame. Instead of the root-mean-square level of the signal, power or energy could also be used. The predetermined parameter is also not limited to the root-mean-square level, but could be any other property specific to the raw signal.

Using the extracted predetermined parameters, the gesture determination means 13 is configured to determine a rising edge and a falling edge in the raw signal. Based on this information, gesture events can then be identified and classified. The further functionality of the gesture determination means 13 will be described in relation to FIGS. 2 and 3.

Figure 2:
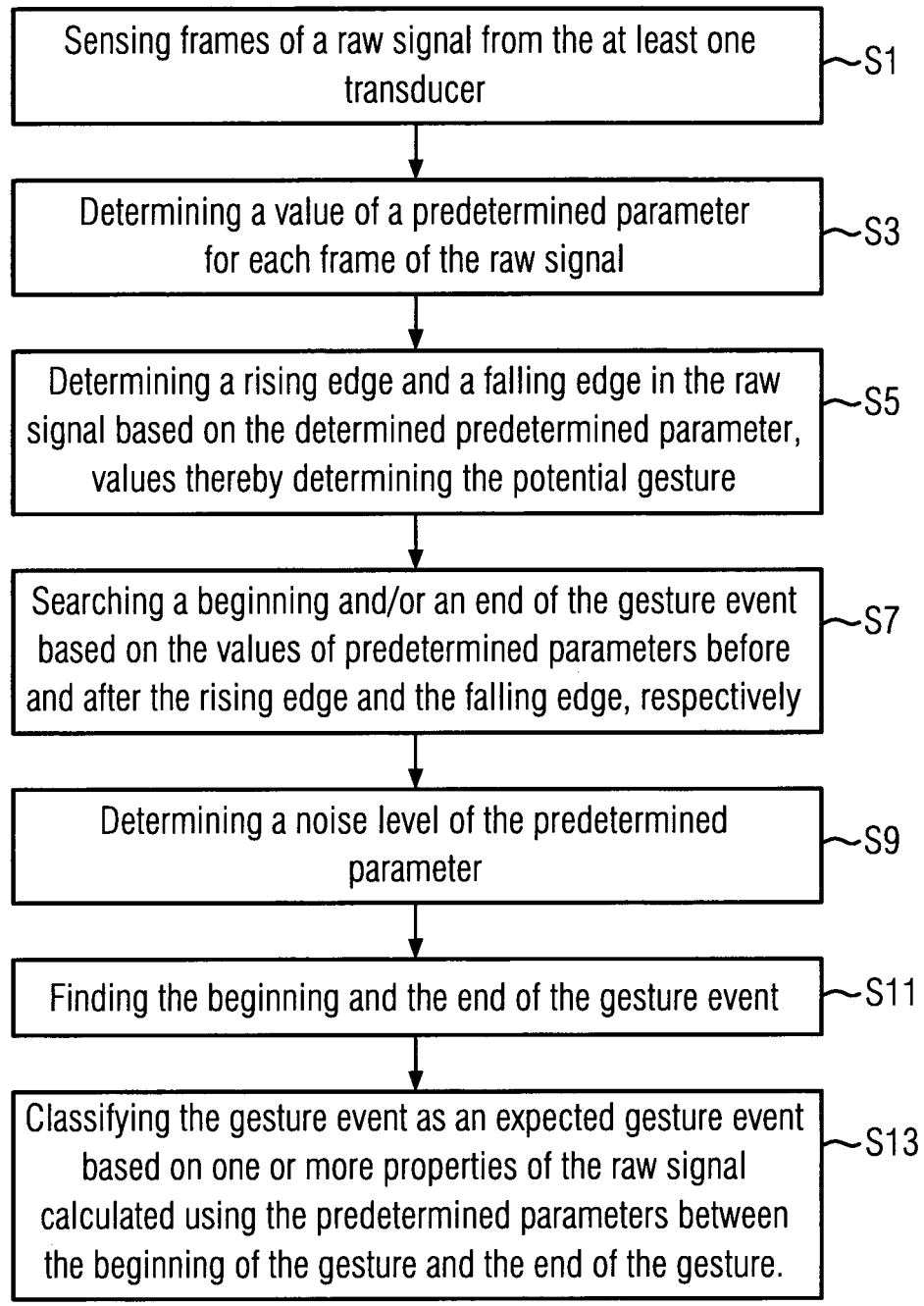
FIG. 2 illustrates a method for determining a gesture event in the touch sensitive device of FIG. 1.

With the flowchart shown in FIG. 2, a method for determining a gesture event in the touch sensitive device 1 of FIG. 1 will be described.

An acoustic wave is generated inside the interface when a user slides or taps over the touch sensitive interface. This acoustic wave is then sensed by the at least one transducer 11a-11d.

During step S1, frames of such a raw acoustic signal captured by the at least one transducer 11a-11d are digitized by the gesture determination means 13.

Figure 3:
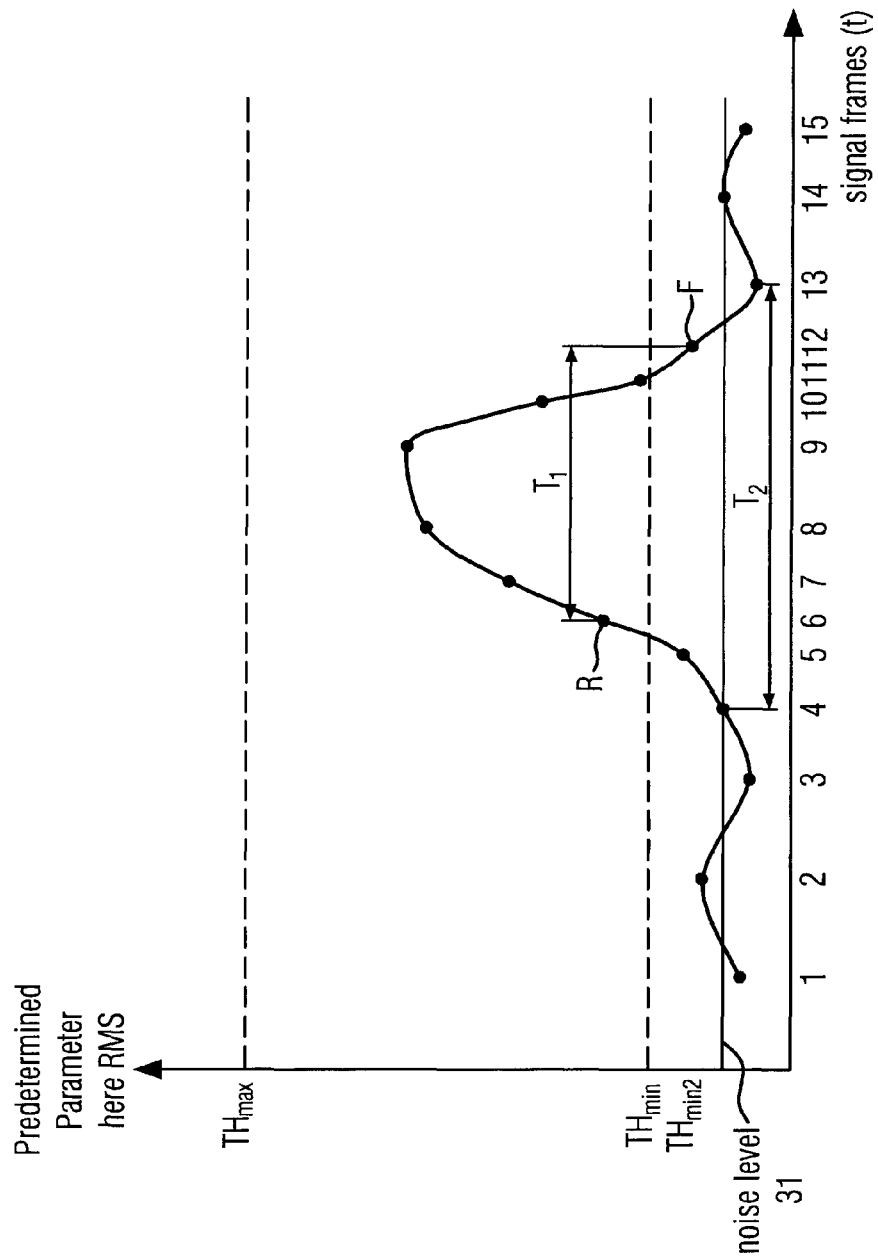
FIG. 3 illustrates a variation versus time of a predetermined parameter corresponding to a gesture event.

For each frame of the raw acoustic signal, a root-mean-square level is determined by the gesture determination means 13 during step S3. FIG. 3. illustrates the variation versus time of the root-mean-square levels corresponding to a gesture event. Depending on the type of gesture to be detected, the root-mean-square value can be determined in a frequency range compatible with the frequency content of the gesture. In this embodiment, the root-mean-square level is determined in a predetermined frequency range, in particular in the frequency range of 20 kHz to 25 kHz. By doing so, unwanted or unexpected impact-like events not related to a desired input of the user can be rejected.

When more than one transducer is provided in the device 1 according to a variant, the root-mean-square level can be averaged over the number of transducers used for gesture determination.

Once the root-mean-square level is determined for each frame, a rising edge and a falling edge in the raw acoustic signal is determined in step S5 based on the determined root-mean-square levels so as to determine the gesture event.

The rising edge and the falling edge detection are explained with respect to FIG. 3, illustrating RMS values per frame. In this embodiment, the rising edge in the raw signal is detected when the root-mean-square level for one of the frames of the raw signal is greater than a minimum threshold THmin and the root-mean-square level for the previous frame of the raw signal is less than the minimum threshold THmin. The frame 6 corresponds to the rising edge which is represented as point R in FIG. 3. As can be seen, the RMS level of the previous frame 5 is below THmin.

The falling edge in the raw signal is detected in a similar way, namely when the root-mean-square level for one of the following frames of the raw signal is less than the minimum threshold THmin and the root-mean-square level for the previous frame of the raw signal is greater than the minimum threshold THmin2. To simplify the process, THmin and THmin2 have the same value in this embodiment but, according to variants, they could also be different. The falling edge is represented as point F in FIG. 3 and corresponds to frame 13. The previous frame 12 has an RMS value greater the THmin2. In a preferred embodiment, THmin and/or THmin2 is/are 3 to 6 dB above noise level.

By setting a minimum threshold THmin and using the root-mean-square levels of two different frames, the rising edge and/or the falling edge can be reliably determined such that the real touch gesture event can be discriminated from the unwanted or unintentional touch events. This will be described in more detail in the following.

The falling edge detection can be aborted when the root-mean-square level for one of the frames of the raw acoustic signal is greater than a maximum threshold THmax. During intended gesture inputs of a user, the user typically does not hit the interface with excessive force. Thus using this rule, unintended inputs to the device leading to strong signals exceeding THmax are filtered out. Preferably, THmax can be a maximum amplitude of the predetermined parameter that can be produced by a desired gesture.

During step S7 of the method according to the present invention, a beginning and/or an end of the gesture event is searched. In fact, the frames R and F do not necessarily correspond to the true start and end of a gesture event. In this embodiment, the beginning and the end of the gesture event are searched based on the root-mean-square levels before and after the rising edge R and the falling edge F, respectively, in the frames of the raw acoustic signal.

In this embodiment according to the invention, the beginning and end of the gesture event are determined by comparing the RMS levels of frames before and after, respectively, the rising edge R and falling edge F with the noise level. In this respect, in step S9, a noise level of the root-mean-square values of the frames is determined using algorithms as known in the art. In FIG. 3 the noise level is indicated by a plane line 31.

Using the noise level 31 of the root-mean-square level determined in step S9, the beginning of the gesture event is found, in step S11, by looking at the RMS values of the frames before the rising edge R at which the root-mean-square level reaches the noise level. In this example, the first frame at which the noise level is obtained is frame 4. Thus, the gesture event started at the noise level in the rising edge side is represented as point $N_R$ in FIG. 3.

Similarly, in step S11, the end of the gesture event is searched by looking for a noise level of the root-mean-square level after the falling edge F, i.e. at frames after the point F in FIG. 3. Here, the end of the gesture event is found at frame 13 at which the root-mean-square level reaches for the first time after F the noise level. As can be seen from FIG. 3, the time duration T1 between the rising and falling edge frames is shorter than the time duration T2 between frames 4 and 13. As T2 is closer to the real duration of the gesture event, T2 will therefore be used to filter out events that cannot represent a gesture event, namely touch events shorter than about 20 ms or longer than 120 ms.

In step S13 of the present embodiment, the determined gesture event is then classified. The classification is based on one or more properties of raw acoustic signal determined out of the root-mean-square levels between the beginning and the end of the gesture found in step S11.

Indeed, the frames between the beginning frame 4 and the end frame 13 include the information necessary to identify the type of gesture. The information in the other frames can be set aside to simplify the gesture detection process.

In one embodiment, one property of the raw acoustic signal used to classify the type of gesture is the ratio between the maximum and the mean root-mean-square levels between the beginning of the gesture and the end of the gesture (this ratio can be called RMS Level Criteria (RLC)). In a specific embodiment, for example, in an eReader backcover type devices, for RLC values of less than 3, a reliable distinction between intended swipe gestures and unintended interactions with the device has been observed.

In another embodiment, the spectral flux is used as the properties of the raw acoustic signal. The spectral flux value is defined as a ratio of the root-mean-square levels of the current frame and previous frame for a given frequency band. Here, the preferred frequency band is in the range of 1 kHz to 25 kHz to get as much data as possible for the classification step. A parameter to the properties of the raw signal is a ratio between the maximum and mean spectral flux values between the beginning of the gesture and the end of the gesture (this ratio is represented as SFC). In a specific embodiment, for example, in an eReader backcover type devices, for SFC values of less than 3.5, a reliable distinction between intended swipe gestures and unintended interactions with the device has been observed. RLC and SLC values can vary depending on any one of the type of device and its material, thickness and the gesture etc.

In a preferred embodiment, the classification in step S13 is realized using a combination of the above two properties of the raw acoustic signal. To use a combination of two different properties to classify gesture events further improves the reliability of the process. Thus, in the specific embodiment described above, the process will identify a gesture event as an intended swipe gesture in case the SFC is >3.5 and the RFC less than 3.

With the above described method, the presence of an intended touch gesture event can reliably be identified based on the detection of a rising edge and a falling edge of the raw signal sensed by one or more transducers. Powerful and more expensive signal processing means for determining the (X, Y) coordinates of the trajectory of a touch gesture event before classifying the touch gesture event are not necessary in this invention. Furthermore, the storing of predetermined locations in a lookup table, as necessary in the prior art, is no longer necessary, thereby simplifying the process of detecting the gesture event. Further, the method and the device become less sensitive to environmental parameters such as, for example, temperature or humidity variations. The gesture determination is also less sensitive to device handling events or a noisy environment which typically disturb the determination of (X, Y) coordinates in the processes known in the art based on the analysis of acoustic waves.

Thus, for any device for which it is sufficient to identify a type of gesture event without necessarily needing the exact coordinates, the invention proposes a simplified yet reliable way to identify intended gesture based inputs.

The invention claimed is:

1. Method for determining a gesture event in a touch sensitive device comprising at least one transducer, the method comprising the steps of:

sensing frames of a raw signal from the at least one transducer;

determining a value of a predetermined parameter for each frame of the raw signal;

determining a first point, the first point being a frame occurring before a rising edge;

determining a second point, the second being a frame occurring after a falling edge in the raw signal based on the values of the predetermined parameter, wherein determining the rising edge comprises detecting when (i) a value of the predetermined parameter for one of the frames of the raw signal is greater than a first minimum threshold and (ii) a value of the predetermined parameter for the previous frame of the raw signal is less than a second minimum threshold, the first minimum threshold being greater than the second minimum threshold; and wherein determining the falling edge comprises detecting when (i) a value of the predetermined parameter for one of the frames of the raw signal is less than the second minimum threshold and (ii) a value of the predetermined parameter for the previous frame of the raw signal is greater than the first minimum threshold; and determining the gesture event by identifying a gesture event start point, the gesture event start point being the frame at which the predetermined parameter first meets a threshold indicative of a noise level before the first point, which was determined as being the frame occurring before the rising edge; and identifying a gesture event end point, the gesture event end point being the frame at which the predetermined parameter falls below the noise level after the second point, which was determined as being the frame occurring after the falling edge.

2. Method according to claim 1, further comprising the at least one of:

searching the beginning of the gesture event based on the values of the predetermined parameters in the frames sensed before the rising edge; or searching the end of the gesture event based on the values of the predetermined parameters in frames sensed after the falling edge.

3. Method according to claim 2, further comprising a step of:

classifying the gesture event as an expected gesture event based on one or more properties of the raw signal calculated using the values of the predetermined parameters between the beginning of the gesture and the end of the gesture.

4. Method according to claim 3, wherein one of the properties of the raw signal is a ratio between the maximum and mean predetermined parameter values between the beginning of the gesture and the end of the gesture.

5. Method according to claim 3, wherein a spectral flux value is defined as a ratio of the predetermined parameter values of the current frame and previous frame and one of the properties of the raw signal is a ratio between the maximum and mean spectral flux values between the beginning of the gesture and the end of the gesture.

6. Method according to claim 3, wherein the step of classifying the gesture event as an expected gesture event is carried out only if the duration between the rising edge and the falling edge or between the beginning and end of the gesture event is within a predetermined range, the predetermined frequency range being from 20 ms to 120 ms.

7. Method according to claim 1, wherein the predetermined parameter for each frame the raw signal is determined in a predetermined frequency range, the predetermined frequency range being 20 kHZ to 25 kHz.

8. Method according to claim 1, wherein the falling edge detection is aborted when a value of the predetermined parameter for one of the frames of the raw signal is greater than a maximum threshold.

9. Method according to claim 3, wherein the gesture event is classified as a specific gesture if the one or more properties of the raw signal is/are less than a set threshold.

10. Method according to claim 1, wherein the raw signal is sensed from more than the one transducer, and the value of the predetermined parameter is the average predetermined parameter value arrived at by averaging over the number of transducers.

11. Method according to claim 1, wherein the predetermined parameter is a root-mean-square level of the raw signal, in particular of any one of the energy, amplitude of the raw signal.

12. An apparatus comprising:
a touch sensitive interface wherein a front and/or a back and/or any one of the sides of the apparatus act as touch sensitive interface; and
a touch sensing means configured to:
sense frames of a raw signal from the at least one transducer;
determine a value of a predetermined parameter for each frame of the raw signal; and
determine first point, the first point being a frame occurring before a rising edge;
determine a second point, the second being a frame occurring after a falling edge in the raw signal based on the values of the predetermined parameter,
wherein determining the rising edge comprises detecting when (i) a value of the predetermined parameter for one of the frames of the raw signal is greater than a first minimum threshold and (ii) a value of the predetermined parameter for the previous frame of the raw signal is less than a second minimum threshold, the first minimum threshold being greater than the second minimum threshold;
wherein determining the falling edge comprises detecting when (i) a value of the predetermined parameter for one of the frames of the raw signal is less than the second minimum threshold and (ii) a value of the predetermined parameter for the previous frame of the raw signal is greater than the first minimum threshold; and
determine the gesture event by identifying a gesture event start point, the gesture event start point being the frame at which the predetermined parameter first meets a threshold indicative of a noise level before the first point, which was determined as being the frame occurring before the rising edge; and identifying a gesture event end point, the gesture event end point being the frame at which the predetermined parameter falls below the noise level after the second point, which was determined as being the frame occurring after the falling edge.

13. The apparatus according to claim 12, wherein the touch sensing means is further configured to least one of:
search the beginning of the gesture event based on the values of the predetermined parameters in the frames sensed before the rising edge; or
search the end of the gesture event based on the values of the predetermined parameters in frames sensed after the falling edge.

14. The apparatus according to claim 13, wherein the touch sensing means is further configured to:
classify the gesture event as an expected gesture event based on one or more properties of the raw signal calculated using the values of the predetermined parameters between the beginning of the gesture and the end of the gesture.

15. The apparatus according to claim 14, wherein one of the properties of the raw signal is a ratio between the maximum and mean predetermined parameter values between the beginning of the gesture and the end of the gesture.

16. The apparatus according to claim 14, wherein a spectral flux value is defined as a ratio of the predetermined parameter values of the current frame and previous frame and one of the properties of the raw signal is a ratio between the maximum and mean spectral flux values between the beginning of the gesture and the end of the gesture.

* * * * *